United States Patent Office 2,925,416
Patented Feb. 16, 1960

2,925,416

3,11-DIOXYGENATED 17-CARBOXYETHYL-9-HALO-ANDROST-4-EN-17-OL LACTONES, 2-METHYL COMPOUNDS CORRESPONDING, AND INTERMEDIATES THERETO

Edward A. Brown and John A. Cella, Skokie, Ill., assignors to G. D. Searle & Co., Chicago, Ill., a corporation of Delaware No Drawing. Application April 6, 1959
Serial No. 804,139

12 Claims. (Cl. 260—239.57)

This invention relates to optionally alkylated 3,11-dioxygenated 17-carboxyalkyl-9-haloandrost-4-en-17-ol lactones and processes for the manufacture thereof. More particularly, this invention relates to compounds of the formula

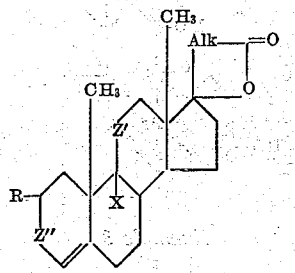

wherein Alk is an alkylene or alkenylene radical, R is hydrogen or a methyl radical, X is halogen, and Z' and Z" are carbonyl or hydroxymethylene radicals.

Among the radicals contemplated by Alk in the formula, those which contribute at least 2 and fewer than 4 carbon atoms are preferred, for example, ethylene, vinylene, trimethylene, and propenylene groupings, as also radicals derived therefrom by the replacement of hydrogen therein with 1 or more lower alkyl groupings. The halogens referred to by X in the formula are preferably those with atomic numbers less than 53, namely, fluorine, chlorine, and bromine.

Equivalent to the foregoing lactones for purposes of this invention are the corresponding hydroxy acids and their alkali salts, of the formula

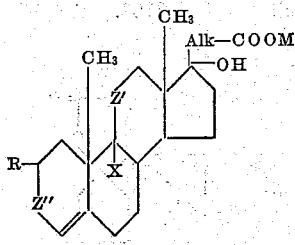

wherein Alk, R, X, Z', and Z" are defined as before and M is hydrogen, an alkali metal, or the ammonium radical. Those skilled in the art will appreciate that the described salts are readily derived from the corresponding lactones on contact with aqueous alkali; and the free acids, in turn, are obtained from the salts by a critically brief exposure to a proton source. Prolongation of the exposure time induces lactonization.

The lactones, hydroxy acids, and salts hereinabove set forth are useful because of their valuable pharmacological properties. For example, they are diuretics, being adapted to block the effect of desoxycorticosterone acetate on urinary sodium and potassium. Moreover, they are progestational agents. It follows that the intermediates from which these products can be obtained are also useful.

Manufacture of the aforesaid products proceeds from 17α-(2-carboxyethyl)-11α,17β-dihydroxyandrost-4-en-3-one lactone, an embodiment of the invention disclosed in an application of John A. Cella, Serial No. 682,626, filed September 9, 1957, which embodiment is a sole development of the said John A. Cella.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade and relative amounts of materials in parts by weight, except as otherwise noted.

Example 1

A. *17α - (2 - carboxyethyl)-11α,17β-dihydroxyandrost-4-en-3-one lactone hemimethanolate.*—A stainless steel fermentation tank is charged with a nutrient medium containing, per 1000 parts of tap water, 33 parts of dextrose, 5 parts of commercial cotton seed meal flour, 3 parts of corn steep liquor, and 2 parts of silicone anti-foam emulsion. Tank and medium are sterilized by heating to a temperature of 110–120° and then cooled to about 25°, whereupon the medium is inoculated with an aqueous suspension of spores from a culture of Rhizopus sp. A.T.C.C. 13429. The medium is maintained at about 25° for 29 hours, during which time a stream of sterile air is passed through and the developing culture is agitated to produce submerged growth. Sufficient 17α-(2-carboxyethyl)-17β-hydroxyandrost-4-en-3-one lactone dissolved in a minimal quantity of acetone is then introduced to bring the concentration of steroid to 1 part per 3000 parts of medium. Agitation with aeration at about 25° is thereupon resumed for 12 hours, at the end of which time the resultant mixture is extracted with dichloromethane. The extract is dried over anhydrous sodium sulfate and stripped of solvent by distillation. The residual oil, on trituration with anhydrous ether, crystallizes. Recrystallization from methanol affords the desired 17α-(2-carboxyethyl)-11α,17β-dihydroxyandrost-4-en-3-one lactone hemimethanolate melting at 173–174°. The product is further characterized by a maximum in the ultraviolet spectrum at 241 millimicrons with a molar extinction coefficient of 15,900. The specific rotation of a dioxane solution, referred to sodium D, is +48°. The product has the formula.

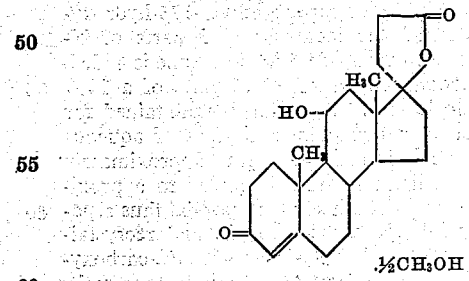

B. *17α-(2-carboxyethyl) - 17β-hdyroxy-11α-methylsulfonyloxyandrost-4-en-3-one lactone.*—To a solution of 2 parts of 17α-(2-carboxyethyl)-11α,17β-dihydroxyandrost-4-en-3-one lactone hemimethanolate in 13 parts of redistilled chloroform is added, with agitation, 2 parts of pyridine, followed over a period of approximately 10 minutes by a solution of 1 part of methanesulfonyl chloride in 3 parts of chloroform, temperatures being held in the range −5° to 0° throughout. The resultant solution is allowed to warm to approximately 5° and maintained at that temperature for 16 hours. It is then diluted with 3 volumes of chloroform and washed successively with water, dilute sulfuric acid, water, dilute aqueous sodium bicarbonate, and finally water again. The solution is then dried over anhydrous sodium sulfate and stripped of solvent by vacuum distillation at temperatures not to exceed 25°. The sirupy residue is taken up in 5 parts of anhydrous ethanol. From the ethanol solution, upon refrigeration and standing, 17α-(2-carboxyethyl)-17β-hydroxy-11α-methylsulfonyloxyandrost-4-en-3-one lactone precipitates. The product, isolated by filtration and dried in air, melts at 157–163° (with decomposition). It has the formula

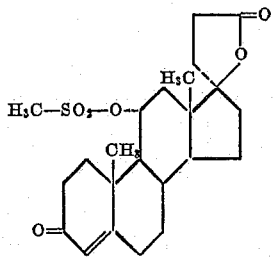

C. *17α-(2-carboxyethyl) - 17β - hydroxyandrosta - 4,9 (11)-dien-3-one lactone.*—To 11 parts of anhydrous powdered sodium acetate at 110–115° is added 100 parts of glacial acetic acid, followed portionwise over a 5-minute period by 4 parts of 17α-(2-carboxyethyl)-17β-hydroxy-11α-methylsulfonyloxyandrost-4-en-3-one lactone. The resultant mixture is maintained at 110–115° under reflux with occasional agitation for a total of 30 minutes, whereupon it is cooled to room temperatures and then diluted with 200 parts of water. Further cooling to around 5°, causes precipitation of the desired 17α-(2-carboxyethyl)-17β-hydroxyandrosta-4,9(11)-dien-3-one lactone as tiny needles melting at 155.5–157°. This melting point can be raised by recrystallization from ethyl acetate to approximately 157.5–158°. The product has the formula

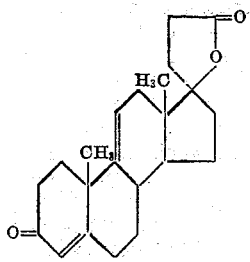

D. *9α-bromo-17α-(2-carboxyethyl) - 11β,17β-dihydroxyandrost-4-en-3-one lactone.*—To a solution of approximately 10 parts of 17α-(2-carboxyethyl)-17β-hydroxyandrosta-4,9(11)-dien-3-one lactone and 5 parts of N-bromoacetamide in 160 parts of purified dioxane is added, with agitation at room temperatures, 16 parts of a 10% solution of perchloric acid. Agitation is maintained for 10 minutes longer, at which point 545 parts of aqueous 2% sodium bisulfite is introduced during approximately 3 minutes. The resultant mixture is cooled to approximately 5° and filtered. The insoluble material thus separated is washed with water, dried in air, and recrystallized from ethanol to give 9α-bromo-17α-(2-carboxyethyl)-11β,17β-dihydroxyandrost-4-en-3-one lactone melting at 162–164°. The product has the formula

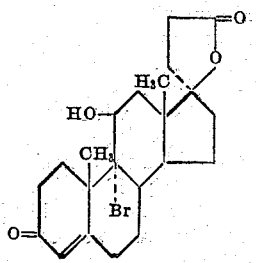

Example 2

*9α-bromo-17α-(2-carboxyethyl)androst - 4-ene-3β,11β,17β-triol lactone.*—A solution of 5 parts of sodium borohydride in 160 parts of methanol is added to a suspension of 7 parts of 9α-bromo-17α-(2-carboxyethyl)-11β,17β-dihydroxyandrost-4-en-3-one lactone in 560 parts of methanol. The resultant mixture is let stand for 45 minutes, whereupon unreacted borohydride is decomposed by the cautious addition of a solution of 80 parts of acetic acid in 300 parts of water. The mixture thus obtained is concentrated to approximately ½ volume by distillation and then diluted with 3000 parts of water. The solid which separates on standing is filtered off and dried in air. This material is the desired 9α-bromo-17α-(2-carboxyethyl)androst - 4-ene-3β,11β,17β-triol lactone, of the formula

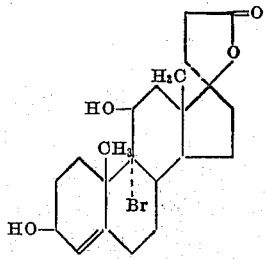

Example 3

A. *17α-(2-carboxyethyl) - 9β,11β-epoxy-17β-hydroxyandrost-4-en-3-one lactone.*—To a solution of 2 parts of freshly fused potassium acetate in 16 parts of absolute ethanol at the boiling point under reflux is added a solution of 3 parts of 9α-bromo-17α-(2-carboxyethyl)-11β,17β-dihydroxyandrost-4-en-3-one lactone in 10 parts of purified dioxane. Boiling is continued for 40 minutes, whereupon the materials are chilled to 0–5° and diluted with 50 parts of water. Refrigeration of the resultant mixture produces a crystalline precipitate which is collected on a filter and washed thereon with water. Recrystallization of this material from a mixture of acetone and hexane affords 17α-(2-carboxyethyl)-9β,11β-epoxy-17β-hydroxyandrost-4-en-3-one lactone melting in the range 189–198°. Upon recrystallization from methanol, the product melts at 205–210°. The product has the formula

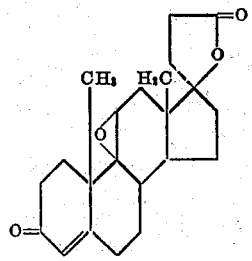

B. *17α-(2-carboxyethyl) - 9β,11β-epoxy-17β-hydroxy-2-hydroxymethyleneandrost-4-en-3-one lactone sodio derivative.*—An anhydrous solution of 9 parts of 17α-(2-carboxyethyl)-9β,11β-epoxy - 17β-hydroxyandrost-4-en-3-one lactone in 120 parts of benzene is added to a suspension of 8 parts of sodium methylate in 72 parts of dry benzene. Approximately 108 parts of ethyl formate is then introduced; and after 3 days at room temperatures, the resultant mixture is filtered. The tan solid recovered thus is washed with ether and dried in air. This material is 17α-(2-carboxyethyl)-9β,11β-epoxy-17β-hydroxy- 2-hydroxymethyleneandrost-4-en-3-one lactone sodio derivative. It has the formula

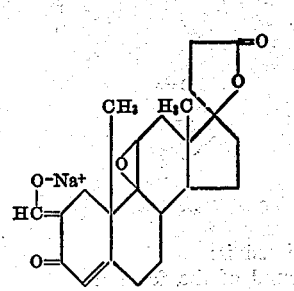

C. *17α-(2-carboxyethyl) - 9β,11β-epoxy-17β-hydroxy-2α-methylandrost-4-en-3-one lactone.*—A mixture of 20 parts of 17α-(2-carboxyethyl) - 9β,11β - epoxy - 17β-hydroxy-2-hydroxymethyleneandrost-4-en-3-one lactone sodio derivative, 44 parts of methyl iodide, 13 parts of freshly ignited potassium carbonate, and 130 parts of anhydrous acetone is heated at the boiling point under reflux with agitation for 23 hours. The mixture is then chilled and taken up in 1300 parts of ether. The ether solution is washed first with water, then several times with aqueous 4% sodium hydroxide (until the washings are colorless), and finally with water again. The solution is then dried over anhydrous sodium sulfate and stripped of solvent by vacuum distillation. The amorphous yellow solid obtained as a residue is dissolved in 50 parts of methanol. To this solution is added a solution of 6 parts of sodium hydroxide in 6 parts of water. The resultant mixture is heated at the boiling point under reflux for 10 minutes and then poured into 300 parts of water. Just sufficient dilute hydrochloric acid is thereupon introduced to start precipitation, at which point dilute acetic acid is added until the pH drops to 6.0. The tan precipitate thrown down is filtered off, washed with water, and dried in air. This material is 17α-(2-carboxyethyl)-9β,11β-epoxy - 17β-hydroxy - 2α-methylandrost-4-en-3-one lactone. It has the formula

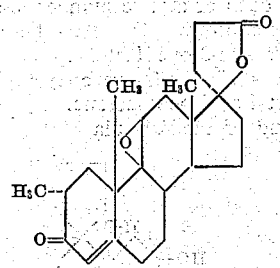

D. *17α-(2-carboxyethyl)9α-fluoro-11β,17β-dihydroxy-2α-methylandrost-4-en-3-one lactone.*—To a solution of 26 parts of anhydrous hydrogen fluoride in 45 parts of redistilled tetrahydrofuran is added, with agitation at temperatures of the order of —50° during 6 minutes, a solution of 4 parts of 17α-(2-carboxyethyl)-9β,11β-epoxy-17β-hydroxy-2α-methylandrost-4-en-3-one lactone in 140 parts of redistilled chloroform. The reactants are maintained at the prescribed temperature with agitation for approximately 10 minutes, then allowed to warm to —5 to 0° and held in this range for 3 hours. The resultant solution is diluted with 3 volumes of chloroform; and this solution, in turn, is successively washed with water, aqueous dilute sodium bicarbonate, and finally water again. The solution is then dried over anhydrous sodium sulfate and stripped of solvent by vacuum distillation. The amorphous residue thus obtained is crystallized from ethyl acetate and then from acetone to give 17α-(2-carboxyethyl) - 9α-fluoro- 11β,17β - dihydroxy-2α-methylandrost-4-en-3-one lactone melting in the range 296–302° (with decomposition). The product has the formula

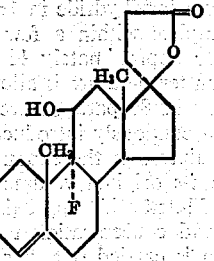

*Example 4*

*17α - (2-carboxyethyl) - 9α-fluoro-2α-methylandrost-4-ene-3β,11β,17β-triol lactone.*—Substitution of 6 parts of 17α-(2-carboxyethyl) - 9α-fluoro - 11β,17β-dihydroxy-2α-methylandrost-4-en-3-one lactone for the 5 parts of 9α-bromo-17α-(2-carboxyethyl) - 11β,17β-dihydroxyandrost-4-en-3-one lactone called for in Example 2 affords, by the procedure there detailed, 17α-(2-carboxyethyl)-9α-fluoro-2α-methylandrost - 4-ene-3β,11β,17β - triol lactone, of the formula

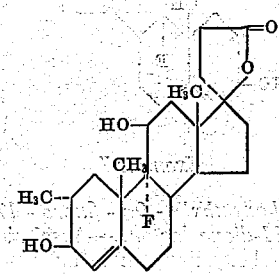

*Example 5*

*17α - (2 - carboxyethyl) - 9α - fluoro - 11β,17β - dihydroxyandrost-4-en-3-one lactone.*—To a solution of 24 parts of anhydrous hydrogen fluoride in 45 parts of a redistilled tetrahydrofuran is added, with agitation at temperatures of the order of —50° during roughly 3 minutes, a solution of 1 part of 17α-(2-carboxyethyl)-9β,11β-epoxy-17β-hydroxyandrost-4-en-3-one lactone in 140 parts of cold redistilled chloroform. The reactants are then allowed to warm to —5 to 0° and are maintained in this range for 3½ hours. Approximately 3 volumes of chloroform is thereupon introduced; and the resulting solution is washed successively with water, aqueous dilute sodium bicarbonate, and water again. The solution is then dried over anhydrous sodium sulfate and stripped of solvent by vacuum distillation. The crystalline residue is recrystallized from ethyl acetate to give the desired 17α - (2 - carboxyethyl) - 9α - fluoro - 11β,17β - dihydroxyandrost-4-en3-one lactone melting at 276–278° (with decomposition). The product has the formula

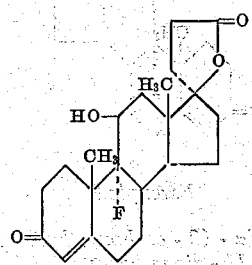

*Example 6*

*17α - (2 - carboxyethyl) - 9α - fluoroandrost - 4 - ene-3β,11β,17β-triol lactone.*—To a substantially clear solution of 6 parts of 17α-(2-carboxyethyl)-9α-fluoro-11β, 17β-dihydroxyandrost-4-en-one lactone in 560 parts of methanol is added, with agitation at 35°, a solution of 5 parts of sodium borohydride in 160 parts of methanol. Solution is complete within a few minutes. Agitation is continued for approximately ½ hour, during which time the reaction temperature is allowed to fall to around 25°. A solution of 80 parts of acetic acid in 300 parts of water is then cautiously introduced during 5 minutes. The resultant mixture is thereupon concentrated to approximately ½ its original volume by vacuum distillation and then diluted with approximately 5 volumes of water. A second concentration to ½ volume by vacuum distillation is carried out, this time precipitating a granular solid which, recrystallized from aqueous ethanol, melts at 143–146°. The product thus obtained is 17α-(2-carboxyethyl)-9α-fluoroandrost-4-ene-3β,11β,17β-triol lactone, of the formula

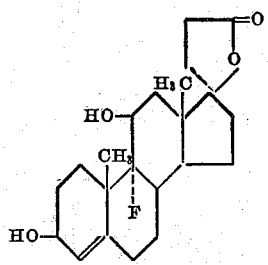

*Example 7*

*17α-(2-carboxyethyl)-9α-fluoro-17β-hydroxyandrost-4-ene-3,11-dione lactone.*—A solution of 2 parts of 17α-(2-carboxyethyl)-9α-fluoro-11β,17β-dihydroxyandrost-4-en-3-one lactone in 100 parts of pyridine is slowly added with agitation at approximately 20° to a pyridine-chromic acid complex prepared by cautious mixing of 2 parts of chromium trioxide with 50 parts of pyridine. The resultant mixture is maintained at approximately 20° for 15 minutes, and then allowed to stand at room temperatures overnight. The mixture is then extracted with ethyl acetate in the presence of 250 parts of water. The ethyl acetate extract is successively washed with water, dilute hydrochloric acid, and water again; dried over anhydrous sodium sulfate; and stripped of solvent by vacuum distillation. The residue, recrystallized from a mixture of ethyl acetate and hexane, affords the desired 17α-(2-carboxyethyl)-9α-fluoro, 17β-hydroxyandrost-4-ene-3,11-dione lactone, which melts at 238–239° and has the formula

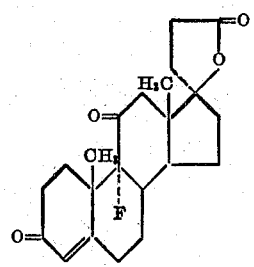

*Example 8*

*9α-bromo-17α-(2-carboxyethyl)-17β-hydroxyandrost-4-ene-3,11-dione lactone.*—Substitution of 9α-bromo-17α-(2-carboxyethyl)-11β,17β-dihydroxyandrost-4-en-3-one lactone for the 17α-(2-carboxyethyl)-9α-fluoro-11β,17β-dihydroxyandrost-4-en-3-one lactone called for in Example 7 affords, by the procedure there detailed, 9α-bromo-17α-(2-carboxyethyl)-17β-hydroxyandrost-4-ene-3,11-dione lactone, of the formula

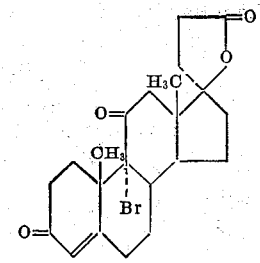

What is claimed is:
1. A compound of the formula

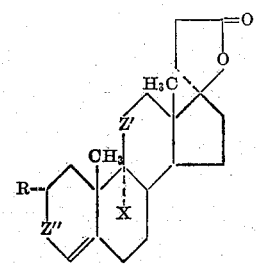

wherein R is selected from the group consisting of hydrogen and the methyl radical, X is halogen of atomic number less than 53, and Z' and Z'' are selected from the group consisting of carbonyl and hydroxymethylene radicals.

2. A compound of the formula

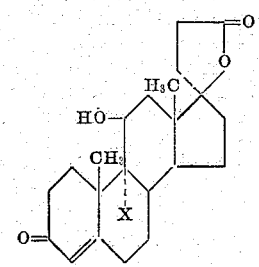

wherein X is halogen of atomic number less than 53.

3. 17α-(2-carboxyethyl)-9α-fluoro-11β,17β-dihydroxyandrost-4-en-3-one lactone.

4. 9α-bromo-17α-(2-carboxyethyl)-11β,17β-dihydroxyandrost-4-en-3-one lactone.

5. A compound of the formula

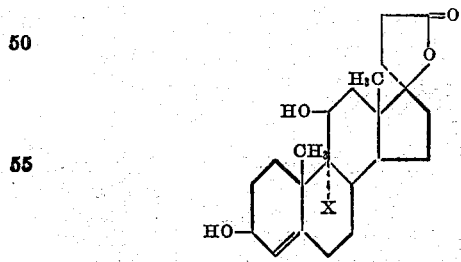

wherein X is halogen of atomic number less than 53.

6. 17α-(2-carboxyethyl)-9α-fluoroandrost-4-ene-3β,11β,17β-triol lactone.

7. A compound of the formula

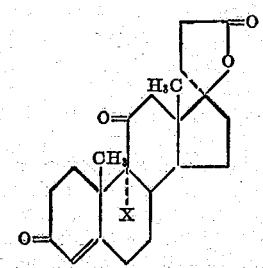

wherein X is halogen of atomic number less than 53.

8. 17α - (2 - carboxyethyl) - 9α - fluoro - 17β - hydroxy-4-ene-3,11-dione lactone.

9. 17α - (2 - carboxyethyl) - 9α - fluoro - 11β,17β-dihydroxy-2α-methylandrost-4-en-3-one lactone.

10. As an intermediate to the product of claim 9, 17α - (2 - carboxyethyl) - 9β,11β - epoxy - 17β - hydroxyandrost-4-en-3-one lactone.

11. As an intermediate to the product of claim 4, 17α - (2-carboxylethyl) - 17β - hydroxy - 11α - methylsulfonyloxyandrost-4-en-3-one lactone.

12. As an intermediate to the product of claim 4, 17α-(2 - carboxyethyl) - 17β - hydroxyandrosta - 4,9(11)-dien-3-one lactone.

No references cited.

UNITED STATES PATENT OFFICE
CERTIFICATE OF CORRECTION

Patent No. 2,925,416            February 16, 1960

Edward A. Brown et al.

It is hereby certified that error appears in the printed specification of the above numbered patent requiring correction and that the said Letters Patent should read as corrected below.

Column 6, lines 10 to 14, the lower left-hand portion of the formula should appear as shown below instead of as in the patent:

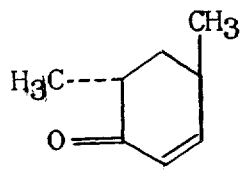

column 7, line 1, for "17β-dihydroxyandrost-4-en-one" read -- 17β-dihydroxyandrost-4-en-3-one --; column 9, lines 1 and 2, for "-hydroxy-4-ene-" read -- -hydroxyandrost-4-ene- --.

Signed and sealed this 23rd day of August 1960.

(SEAL)
Attest:

KARL H. AXLINE
Attesting Officer

ROBERT C. WATSON
Commissioner of Patents